Figure 1:
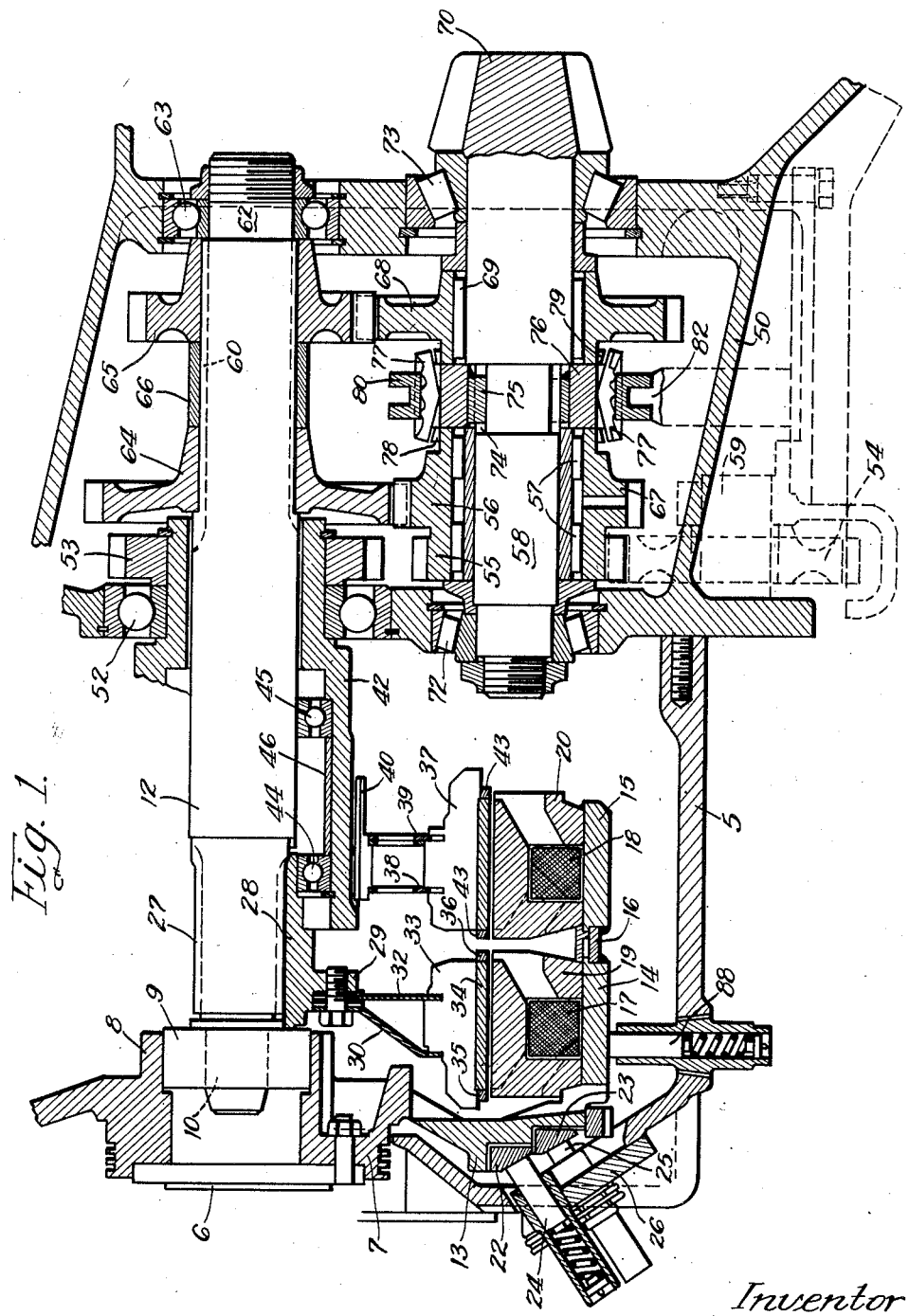

Inventor:
Elmer J. Dunham,
By Walter E. Schirmer
Atty.

Patented Apr. 24, 1951

2,549,896

UNITED STATES PATENT OFFICE 2,549,896

MULTIPLE FORWARD AND REVERSE SPEEDS TRANSMISSION

Elmer J. Dunham, Battle Creek, Mich., assignor to Clark Equipment Company, Buchanan, Mich., a corporation of Michigan Application July 21, 1947, Serial No. 762,439

10 Claims. (Cl. 74—330)

1

This invention relates to transmission mechanisms and more particularly is concerned with the provision of a transmission and clutch combination providing for forward and reverse drive in either of two speeds, with double clutches being employed for selecting the direction of drive and a rocking type clutch being selectively operable to provide either low or high speed gear ratio through the transmission.

While the present invention has been designed particularly for use in industrial trucks and tractors, it has wide application, and is shown in this embodiment only for the sake of illustration.

Primarily, the present invention contemplates the provision of two eddy current type clutches, more commonly known as electro-dynamic clutches, which may be arranged coaxially either in radial overlapping position or in side by side axially spaced relation, and which are selectively controllable through suitable switch means, so that the operator may select either one or the other clutch for operation. These clutches are adapted to drive through suitable change speed gearing to the drive axle of the vehicle, and the operator, through a suitable shift control lever, may select either low or high speed in the gear box of the transmission device, irrespective of whether forward or reverse drive through the electric clutches is selected.

One object of the present invention is to eliminate the wear and attendant replacement difficulties heretofore encountered in connection with vehicles of this type, due to the heavy service placed upon clutches of such vehicles in normal operation. The present invention eliminates any frictional contact in the clutch mechanism, and consequently, has no wearing parts.

Still another object of the present invention is to provide a mechanism of this type which can be employed within the same spacial requirements as clutch constructions heretofore used, allowing this actuator to be inserted in place of conventional friction clutches in vehicles now in use as well as in original equipment.

Still another feature of the present invention is the provision of a very compact arrangement for the two clutches which yet allows use of clutches having full torque capacity for the engine, without taking up any additional space, inasmuch as the spacial requirements in trucks of this type are, of necessity, very limited.

Other objects and advantages of the present invention will appear more fully from the following detailed description, which, taken in connection with the accompanying drawings, will

2 disclose to those skilled in the art, the particular construction and operation of preferred forms of the present invention.

Figure 2:
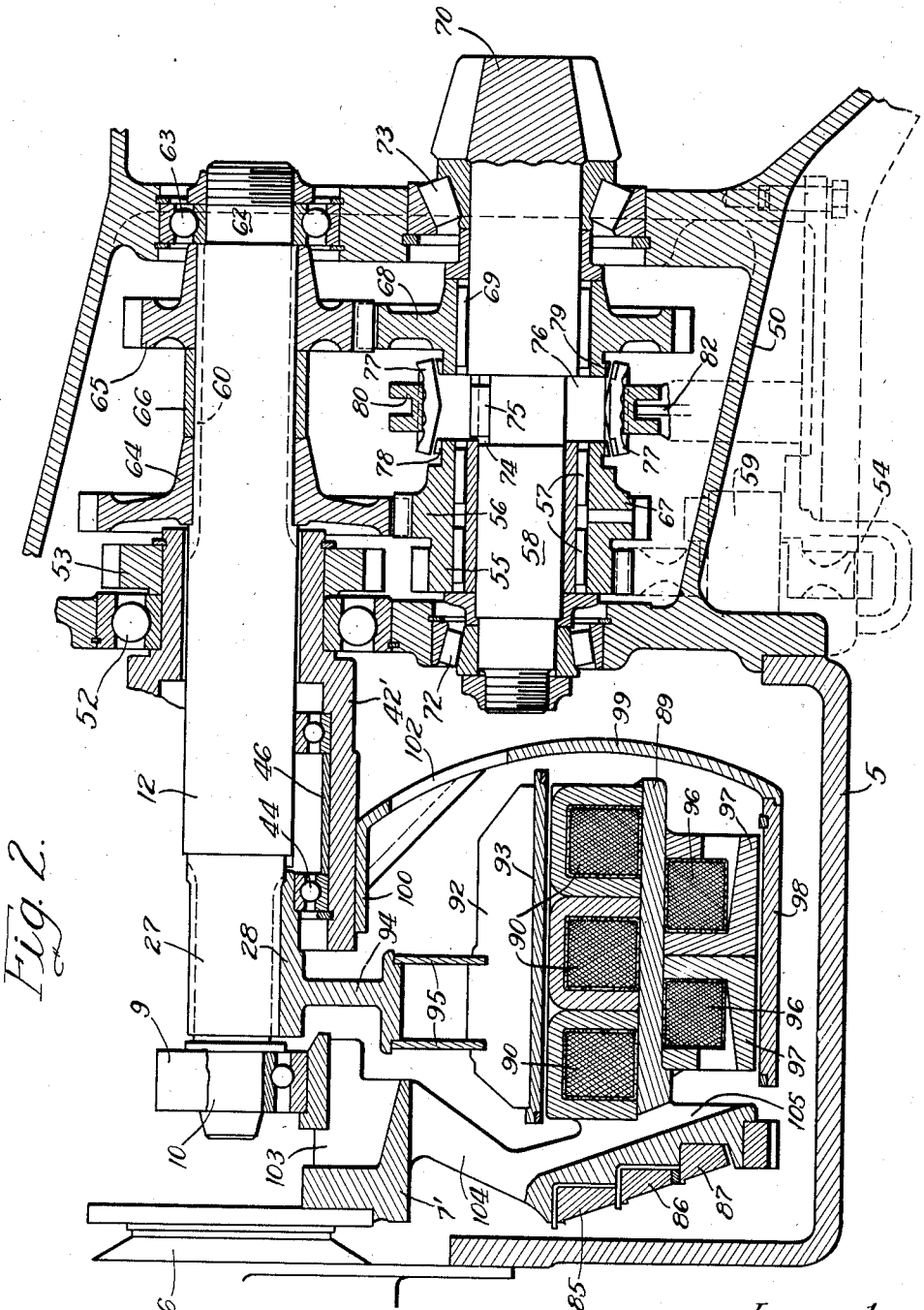

In the drawings:

Figure 1 is a vertical sectional view through a transmission mechanism embodying the invention; and Figure 2 is a corresponding view through a similar transmission mechanism having a modified type of clutch arrangement.

Referring now in detail to the drawings in which similar reference numerals indicate similar parts, there is provided a clutch housing 5, which may be secured in any suitable manner to the flywheel housing of an engine (not shown), having the extending crank shaft 6. Bolted or otherwise suitably secured to the crank shaft 6 is a flywheel 7, having an extending cylindrical portion 8, receiving bearings 9 for journalling the reduced end 10 of a transmission main shaft 12 therein. The flywheel 7 is of relatively light weight and has a radially extending portion 13, which has an axially extending portion 14, forming a rotor member for the driving portion of the eddy current type clutches. This rotor portion consists of two drum like members 14 and 15, preferably joined together, as indicated at 16, by welding or the like, and carries energizing cores or field windings 17 and 18, respectively, enclosed within the field armatures 19 and 20, there being a slight radial space between the members 19 and 20. These members are also preferably provided with alternate or staggered air passages therethrough, opening into the core windings 17 or 18, these windings being substantially rectangular in section and cylindrical in form.

The flywheel housing 13 is also provided with annular contact rings 22 and 23, respectively, the ring 22 being adapted to be engaged by a contact brush 24, and the ring 23 being engaged by the contact brush 25, both carried by a terminal holder 26, bolted or otherwise secured to an inset portion of the housing 5. In this manner, current is led to the respective windings 17 and 18 from the control source, such as a carbon pile rheostat or similar control mechanism.

The shaft 12, intermediate the reduced end 10 and the main portion of the shaft, is provided with a splined portion 27, upon which is mounted the hub sleeve 28, in non-rotative engagement therewith, this sleeve having a radial flange 29, to which is secured two radially extending disc members 30 and 32, these members being seated in the inner periphery of an armature 33, carrying pole pieces 34, bounded at the ends by copper rings 35 and 36.

It will be noted that the pole pieces 34 are of substantially the same axial extent as the inner surfaces of the field armature 19 and that a very small, but uniform, air gap exists therebetween. Upon energizing the coil 17, the rotor member is energized and through the eddy current, tends to energize the pole pieces 34 to produce conjoint rotation therewith. Depending upon the amount of current introduced into the winding 17, the magnetic attraction between this member and the rotating armature 33 will be varied and will result in transmitting torque proportionately to the member 33. When full current is introduced, there is practically no slippage between the members 33 and 19.

It will thus be seen that by selectively energizing the coil winding 17, clutching engagement, through the eddy current effect, is produced on the member 33, which, in turn, transmits torque to the shaft 12.

A second rotating armature member 37 is provided, carried by the radial discs 38 and 39, supported upon a sleeve member 40, splined or otherwise secured to the driving quill 42. Upon energization of the winding 18, a similar magnetic clutching action is effected, transmitting torque from the rotor member 14 through the member 37 into the driving quill 42. The member 37 is provided with similar pole members at its periphery, bounded by the copper shunt rings. The driving quill 42 is preferably mounted upon two roller bearing members 44 and 45, spaced apart by means of spacer 46, whereby the quill is supported for rotation upon the shaft 12.

A suitable transmission housing 50 is secured to the rear end of the housing 5, and carries a forward wall portion closing the rear end of the housing 50 and provides the bearing support 52 for the portion of the quill 42 which extends through the housing 50. At its inner extending end, the quill 42 is provided with a driving gear 53 which may be splined or otherwise suitably secured thereon and which has meshing engagement with an offset idler gear 54, shown out of position in Figures 1 and 2 for the sake of clarity, but which is laterally offset and provides for driving engagement from gear 53 to the gear portion 55 of the compound gear 56, rotatably mounted as by means of bearings 57 upon the countershaft or driven shaft 58 of the transmission. The idler gear 54 is preferably mounted upon a lay shaft 59, journalled in the transmission housing 50, and it will therefore be apparent that whenever the winding 18 is energized, the gear 53 will transmit torque through the idler gear 54 to the gear portion 55 of gear 56, thereby rotating gear 56 in the same direction as the quill 42 is being rotated.

The shaft 12, beyond the end of the quill 42, is provided with a splined portion 60, and with a reduced portion 62, mounted in the bearings 63, carried in the rear end wall of the housing 50. Disposed on the splined portion 60 of this shaft is a pair of gears 64 and 65 spaced apart by means of the sleeve spacer 66. The gear 64 is in constant meshing engagement with the gear portion 67 of the compound gear 56, while the gear 65 is in constant meshing engagement with a gear 68, rotatably mounted upon the driven shaft 58 as by means of the bearings 69. The outer end of the shaft 58 is provided with a pinion 70, for driving the ring gear of a differential in a drive axle assembly, which is not shown for the sake of clarity.

The shaft 58, at its forward end, is supported in the tapered roller bearings 72, carried in the forward wall of the transmission housing 50, and at its rear end, adjacent the pinion 70, is supported in the tapered bearings 73, carried in the rear wall of the housing 50. The shaft 58, intermediate the gears 56 and 58, is provided with a splined portion 74, upon which is mounted the hub portion 75 of a hub member 76, interposed between and spacing the gears 56 and 68 apart. The hub member 76 is provided with a peripheral series of axial slots within which are disposed rocker members 77, these rocker members projecting beyond the axial ends of the hub member 76 and being adapted to be rocked about the fulcrum points into selective clutching engagement with either the external clutch teeth 78 of gear 56 or 79 of gear 68. The rocking action is produced by means of the collar or yoke member 80, peripherally encircling the rocker members and axially slidable upon suitable splines formed in the periphery of the hub member 76, to rock the rocker members radially inwardly at one end into clutching engagement with the selected gearing.

The collar member 80 is preferably actuated by a shaft 82, controlled from a shift rail mounted in the side of the transmission and operable through a shift lever extending into a position adjacent the operator of the vehicle. In the mechanism thus far described, normal forward driving operation is provided by energizing coil 17 through its associated contact brush, thereby magnetically rotating the shaft 12, which, in turn, drives the gears 64 and 65. The operator may then select either high speed or low speed drive by actuation of the shift fork 82, which clutches either gear 56 or gear 68 to the driven shaft 58 for driving the pinion 70. High speed drive is provided through gears 64 and 67, while low speed is provided through gears 65 and 68. During this time, of course, the coil 18 is de-energized and the quill 53 is rotating idly due to its meshing engagement through idler gear 54 with gear portion 55.

When it is desired to reverse the drive of the vehicle, winding 17 is de-energized and winding 18 is energized. This results in the quill 42 driving gear 55, and by actuation of the clutch intermediate the gears 67 and 68, a low speed reverse drive can be provided by clutching gear 67 to shaft 58. If a high speed reverse drive is desired, the gear 68 is clutched to shaft 58, and the drive proceeds from quill 42 through gears 53, 54, and 55, and thence from gear 67 to gear 64 and back into shaft 58 through gears 65 and 68. By providing clutch pedal control for the coils 17 and 18, a gradual acceleration can be provided, depending upon the rate at which the clutch pedal is released from disengaged position. Selection of either the coil 17 or 18 for energization can be controlled by a switch on the steering post of the vehicle.

Low or high speed drive is produced in either direction of drive by proper actuation of the shift lever which actuates the collar 80 for the rocker clutch members 77.

The embodiment shown in Figure 2 of the drawing is substantially similar to that shown in Figure 1, with the exception that the clutch elements, in this form of the invention, are disposed in radially overlapping position, instead of in axial side by side relation. In this form of the invention, the crank shaft 6 has bolted thereto a flywheel member 7' which has the three annular contact rings 85, 86, and 87. The third contact ring is a ground connection similar to the ground terminal 88, shown in Figure 1, which contacts the rotor member 14. The flywheel has an axially extending portion 89 on the inner periphery of which are mounted three energizing coils 90, these coils being electrically connected together and providing a rotating armature or driving actuation upon the driven armature 92, carrying the pole pieces 93 and secured to the shaft 12, through the hub member 94 and radial plates 95. This corresponds to the hub member 28 of Figure 1, and produced the forward drive.

Reverse drive is provided by the coils 96, carried on the outer periphery of the rotor member 89 and having pole pieces 97 associated therewith for producing magnetic actuation of the armature 98, which comprises a cylindrical element encircling the pole pieces 97 and carried on a suitable spider 99, which, in turn, is welded or otherwise suitably secured at its inner hub portion 100, upon the quill 42'. The member 99 may have openings 102 formed therein providing for air circulation into the interior or the clutch construction, and it will be noted that the flywheel 7' has corresponding perforations or air openings 103, 104 and 105 formed therein.

Thus it will be seen that in this embodiment of the invention, the rotor member 89 has energizing coils on both the inner and outer peripheries thereof, and there is provided internal and external armatures adapted to be selectively energized thereby for driving either the shaft 12 or the quill sleeve 42'. Other than this, the operation of the two mechanisms is identical, the gearing being substantially the same in both embodiments of the invention.

It is therefore believed apparent that the present construction provides an improved type of transmission mechanism for vehicles in which there is severe clutch service required, eliminating all frictional drive and providing a very compact two speed forward and reverse transmission mechanism.

I am aware that various changes may be made in certain details of the present invention, and I therefore do not intend to be limited except insofar as defined by the scope and spirit of the appended claims.

I claim:

1. In a torque transmitting drive, an axially projecting shaft, a quill rotatably journaled on said axially projecting shaft, a first housing containing alined eddy current clutches, one of said clutches having the driven element thereof mounted on said axially projecting shaft, the other of said clutches having the driven element thereof mounted on said quill, a second housing, a driven shaft in said second housing, a pair of gear trains each comprising a gear fixed on said axially projecting shaft and a gear rotatably journaled on said driven shaft, clutch means on said driven shaft intermediate said gear trains for selectively clutching either of said gear trains to said driven shaft to provide different driving ratios between said axially projecting shaft and said driven shaft, and reverse drive gearing between said quill and said driven shaft whereby energization of one of said clutches operates to drive said driven shaft directly through one of said gear trains, and energization of said other clutch operates to drive said driven shaft in reverse direction through said reverse drive gearing and thence through said gear trains.

2. In a torque transmitting device, a transmission main shaft having a pair of axially spaced gears fixed thereon, a driven shaft having gears rotatably journalled thereon and driven from said first-named gears, means on said driven shaft for selectively coupling either of said rotatable gears thereto, a quill rotatably mounted on said main shaft and having a gear on one end thereof adjacent one of said pair of gears, reverse idler gear means driven thereby and adapted to drive one of said rotatable gears, and a pair of coaxially alined clutch members having the driven elements thereof respectively drivingly connected to said main shaft and to said quill.

3. In combination, an engine flywheel having separately energized magnetic coils thereon, a pair of coaxially alined armature members adjacent said coils and constituting the driven elements of eddy current clutches, a transmission main shaft driven by one of said elements when energized, a quill rotatably driven by the other element when energized, a pair of axially spaced gears fixed on said main shaft, a gear carried by said quill, a driven shaft, a pair of rotatable gears thereon driven respectively by said main shaft gears, reverse idler gear means drivingly connected between said quill gear and one of said rotatable gears, and means on said driven shaft for selectively coupling either of said pair of rotatable gears thereto.

4. The combination of claim 3 wherein said armature members are disposed in axially spaced relation within said flywheel coils.

5. The combination of claim 3 wherein said armature members are in substantial radial alinement with one member being disposed radially inwardly of said flywheel and the other member radially enclosing said flywheel.

6. The combination of claim 3 including contact rings carried by said flywheel for receiving electrical current to selectively energize said coils.

7. In a torque transmitting device, a transmission housing containing a main shaft and a driven shaft, axially spaced gears fixed on said main shaft, gears rotatable on said driven shaft and driven from said main shaft gears, clutch means on said driven shaft for selectively coupling said rotatable gears thereto, a quill rotatably mounted on said main shaft and having a gear adjacent one of said rotatable gears, reverse idler gear means driven thereby and adapted to drive one of said rotatable gears, and a pair of clutch members having the driven elements thereof respectively drivingly connected to said main shaft and to said quill.

8. In a transmission, the combination of an input shaft, a first pair of axially spaced gears fixed on said input shaft, an output shaft, a second pair of axially spaced gears rotatably journaled on said output shaft and having meshing engagement with said first pair of gears, means on said output shaft for selectively clutching either gear of said second pair of gears thereto, a quill rotatably journaled on said input shaft, a gear fixed on said quill, and reverse idler gear means between said gear on said quill and one gear of said second pair of gears.

9. In a transmission, the combination of an input shaft, an output shaft, a pair of gear trains each comprising a gear fixed on said input shaft and a gear rotatably journaled on said output shaft, clutch means on said output shaft intermediate said gear trains for selectively clutching either of said gear trains to said output shaft, a quill rotatable coaxially of said input shaft, a gear fixed on said quill, and reverse idler gear means between said gear on said quill and one of said gear trains.

10. In a transmission, the combination of an input shaft, first and second gears fixed on said input shaft, an output shaft, a first gear rotatably journaled on said output shaft and having meshing engagement with said first gear on said input shaft, a compound gear having first and second gear elements rotatably journaled on said output shaft, the first gear element of said compound gear having meshing engagement with said second gear on said input shaft, means on said output shaft for selectively clutching either said first rotatable gear or said compound gear to said output shaft, a quill rotatable coaxially of said input shaft, a gear fixed on said quill, and a reverse idler gear having meshing engagement with said gear on said quill and the second gear element of said compound gear.

ELMER J. DUNHAM.

REFERENCES CITED

The following references are of record in the file of this patent:

UNITED STATES PATENTS

| Number | Name | Date |
|---|---|---|
| 1,011,555 | Archie | Dec. 12, 1911 |
| 1,102,378 | Zeitler | July 7, 1914 |
| 1,136,279 | Sevey | Apr. 20, 1915 |
| 1,817,660 | Winther et al. | Aug. 4, 1931 |
| 2,333,037 | Osborn | Oct. 26, 1943 |

FOREIGN PATENTS

| Number | Country | Date |
|---|---|---|
| 26,574 | Great Britain | Nov. 16, 1909 |